Feb. 17, 1970  G. A. WEINERT ET AL  3,496,490
GEAR TOOTH FORM ANALYZER

Filed April 25, 1966  4 Sheets-Sheet 1

INVENTORS
GLEN A. WEINERT
EARL J. TISHLER
BY
John R. Faulkner
Robert E. McCollum
ATTORNEYS

INVENTORS
GLEN A. WEINERT
EARL J. TISHLER

Feb. 17, 1970    G. A. WEINERT ET AL    3,496,490
GEAR TOOTH FORM ANALYZER

Filed April 25, 1966    4 Sheets-Sheet 3

INVENTORS
GLEN A. WEINERT
EARL J. TISHLER
BY
John R. Faulkner
Robert E. McCollum Feb. 17, 1970   G. A. WEINERT ET AL   3,496,490
GEAR TOOTH FORM ANALYZER
Filed April 25, 1966   4 Sheets-Sheet 4

INVENTORS
GLEN A. WEINERT
EARL J. TISHLER

John R. Faulkner
Robert E. McCollum
ATTORNEYS 3,496,490
GEAR TOOTH FORM ANALYZER
Glen A. Weinert, Detroit, and Earl J. Tishler, Dearborn Heights, Mich., assignors to Ford Motor Company, Dearborn, Mich., a corporation of Delaware
Filed Apr. 25, 1966, Ser. No. 545,069
Int. Cl. G01b *3/14, 3/22*
U.S. Cl. 33—179.5                                   3 Claims

ABSTRACT OF THE DISCLOSURE

Two test gear mounting members mount one gear of an offset axes, constant velocity ratio gearset against a tooth portion facsimile of the other gear, the two being driven at a constant velocity ratio with deviations from conjugate action being sensed by a movable stylus; the tooth portion being mounted on a number of angularly interconnected tilting cradles each also rotatably mounted, each movable about a design contact point on the surface of the tooth portion, to universally position the tooth in space at the design attitude and/or the attitude of a finished gear tooth.

---

This invenion relates, in general, to a gear tooth form checking apparatus. More particularly, it relates to an apparatus for checking kinematically the conjugate action of a set of gears that are designed to be a matched set providing a constant velocity ratio. It also relates to an apparatus for measuring variations from design standards of a rotated gear that constitutes one of a set of normally meshed constant velocity ratio gears.

The basic law of all constant velocity gearing states that if the shape of one member is assumed or fixed, then, for the mating surfaces to be conjugate, the mating gear must be formed in a manner that will maintain the design velocity ratio between the gears. It is clear, therefore, that departures from conjugation produce variations in angular displacement in both the plus and minus directions from the design velocity ratio; that is, they produce accelerations or decelerations of one tooth surface relative to the other.

It is known that gear noise level is a direct function of the degree of departure of a gear from a uniform ratio of angular motion; i.e., the level of conjugate error. In the case of motor vehicle rear axle crossed axis type gearsets, for example, at certain speed levels, a variation from conjugate action of the matched set produces a mechanical vibration that is particularly irritating to a passenger in the motor vehicle.

The goal in any gear design of this type, of course, is to eliminate conjugate error both to improve the tooth life and minimize the noise level. However, before this can be done, an apparatus must be available for kinematically measuring variations from conjugate action of a matched set of constant velocity ratio type gears.

Prior to the invention, there was no measuring equipment or information available to accurately compare the lengthwise curvature and profile of the teeth of a finished crossed axis type gear to design standards and specifications. Most of the known methods were quite primitive. One method consisted of rotating a set of test gears at the specified constant velocity drive ratio while the operator listened for an auditory signal that arose due to non-conjugate action when one or the other of the gears accelerated or decelerated from the uniform angular velocity. This type of measurement, of course, is only as accurate as the noise level sensing apparatus, which, in many cases, is nothing more than the human ear.

Furthermore, even if it is assumed that the exact degree of conjugate error can be determined, this provides no indication as to which of the two gear tooth forms is in error, or to what degree the error varies from design. The present practice is that, once it is determined by the listening process that there is conjugate error between the mating teeth of a set of gears, then the gears generally are coated with a marking compound so that the contact pattern can be seen visually, and, by lapping or other suitable processes, the gear teeth re-formed to reduce the conjugate error. As a result, while a particular set of gears may appear to be satisfactory by this method, insofar as the above test is concerned, it provides no absolute standard for the production of similarly formed gears.

The invention provides an apparatus that not only can accurately check the conjugate error between a pair of gears of the type described, but also permits a correlation of the error to design specification to provide information that will be useful to the designer as a compensating factor in future manufacturing. That is, the data furnished by the device of the invention can be used by the designer to correct the non-conjugate action of "noisy" axle gears, predict the effect of gear mounting errors on conjugation, and design the proper accommodation for maximum load conditions.

The invention accomplishes the above by providing an apparatus for rotating the teeth of one of the gears of a constant velocity gearset against the teeth of the other gear, and measuring the variation from conjugate action. Alternatively, the apparatus permits rotating any of the teeth of one of the gears of the constant velocity ratio test set against a tooth-like form that simulates one particular surface of a tooth of the other gear of the set, and again measuring the deviation from conjugate action between the two. The simulated tooth portion, whether it represents a section along the profile or the lengthwise section of the mating tooth, is oriented in space at an attitude that corresponds exactly to the attitude of the gear tooth surface it is simulating. This latter method eliminates the cross-effect of other sections of the tooth during the rolling action with this particular section.

If desired, the test apparatus also permits the simulated tooth portion to be oriented in space at an attitude that corresponds to that which a tooth would have if it could be manufactured exactly as designed; that is, if it could be finished without altering the tooth shape from that described in the design specification. With this type of setup, when the test gear tooth and simulated mating tooth are rotated together, the off-design variation from conjugate action of the test gear tooth can be determined.

In other words, the apparatus of the invention provides a stylus simulating a section of the contact surface of an actual gear tooth, the stylus moving in a path that is kinematically identical to the path the actual mating gear tooth surface would follow. The stylus can be constructed to simulate a portion of a single tooth or represent the successive surfaces of two teeth. The single tooth simulation, however, is preferred, since it permits an anlysis of the conjugate action of one set of mating teeth without interference from circumferentially adjacent teeth. It thus eliminates the usual interference due to the overlapping mesh of more than one tooth at a time.

Thus, the design not only can determine whether or not a particular pair of mating gears has conjugate action, but also whether the particular gear motion varies from a design standard.

It is, therefore, one of the objects of the invention to provide an apparatus for checking the variations from conjugate action of a pair of constant velocity ratio type mating gears.

It is also an object of the invention to provide a gear tooth motion checking apparatus for analyzing the non-conjugate action or off-design motion of a matched set of gears of the constant velocity ratio type.

It is a further object of the invention to provide an apparatus for checking kinematically the variation from conjugate action of a pair of crossed axes mating gears, the apparatus having a movable tooth-like portion simulating a section of a tooth of an imaginary generating gear. The apparatus is adjustable in a number of different planes to permit changes in the attitude in space of the simulated tooth portion. It can be located in space at the same root, spiral, and pressure angles that the tooth section it represents actually has, as a result of the manufacturing finishing operations, or in space at an attitude that the tooth surface it simulates would have if it were capable of being manufactured exactly as designed. Then, when the simulated tooth portion and gear tooth which it engages are rotated together, they rotate, in the former case, with the exact motion that actually occurs between the teeth of two actual gears, or, in the latter case, with a motion that would occur between one of the test gears and a mating tooth that has the theoretically correct contact surface.

Other objects, features and advantages will become apparent upon reference to the succeeding, detailed descriptions of the invention, and to the drawings illustrating a preferred embodiment thereof; wherein.

Figure 1:
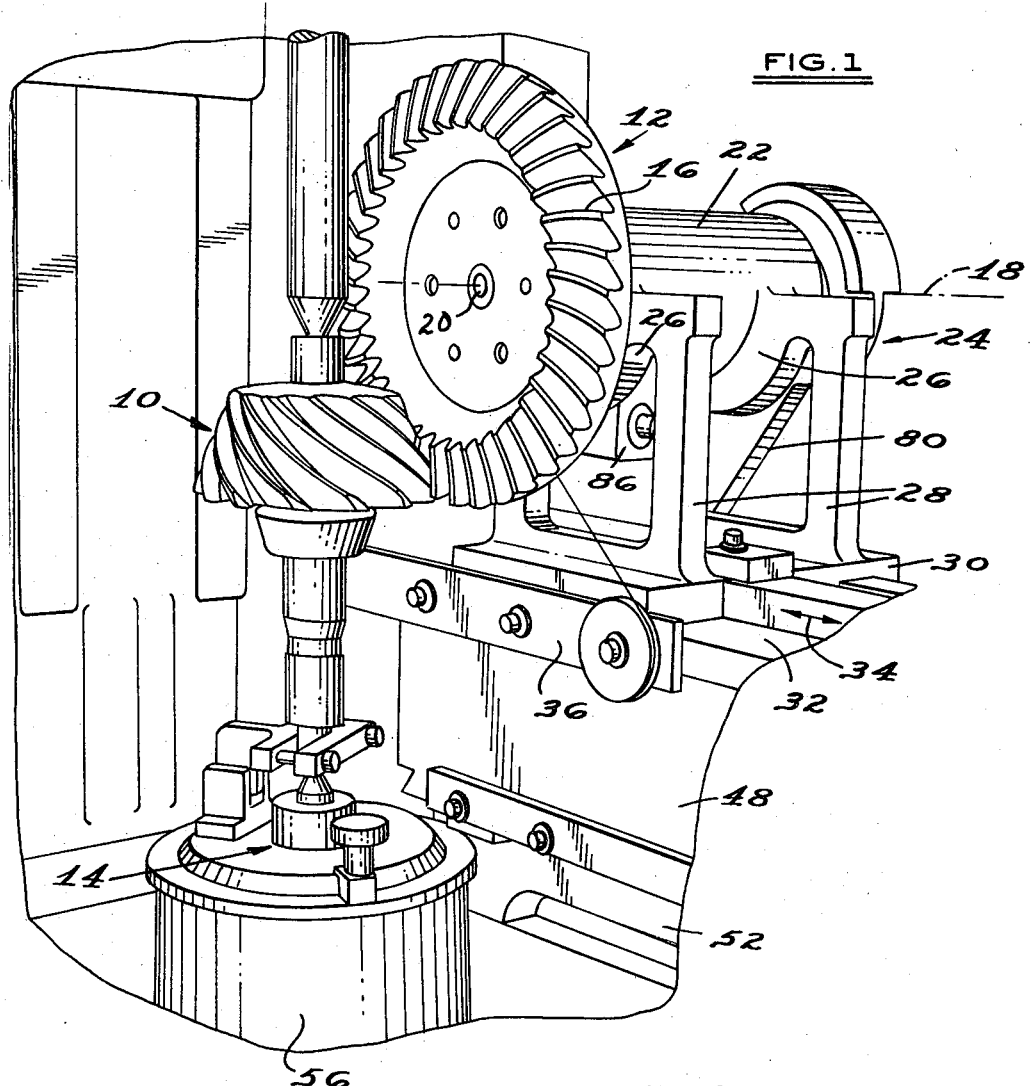
FIGURE 1 shows an isometric elevational view of an apparatus for analyzing the conjugate action of a set of gears of the constant velocity ratio type.

In FIGURE 1, the gear checking apparatus of the invention is set up to check kinematically for conjugate error between the meshing teeth of a matched set of constant velocity ratio gears. In this case, as an example, the gear-set represents a typical hypoid pinion rear axle final drive gearset having conically cut, offset axes, pinion and ring gears 10 and 12.

The gears are adapted to be rotated, by means to be described later, in such a manner that the drive does not contribute any significant error to the motion of the gearset. In general, pinion and ring gears 10 and 12 are adjustably mounted for rotation upon supports in such a manner that the gears are in the same relative positions that they would have were they actually installed in a motor vehicle rear axle carrier assembly.

More specifically, pinion gear 10 is fixed in space on a vertically adjustable and rotatable spindle 14. It has a tooth contact with the teeth 16 of ring gear 12 at a particular design radial offset distance from the horizontal axis of rotation 18 of the ring gear. Ring gear 12 is fixed on a spindle 20 that is rotatably mounted in the upper cylindrical portion 22 of a stationary support housing 24. The housing includes two spaced yoke portions 26 supported on legs 28 integral with a common base 30. The base is slidably mounted on a platform 32 for movement horizontally in the direction of arrow 34. Guide members 36 are secured to opposite edges of platform 32 to define a channel through which base 30 slides.

Figure 2:
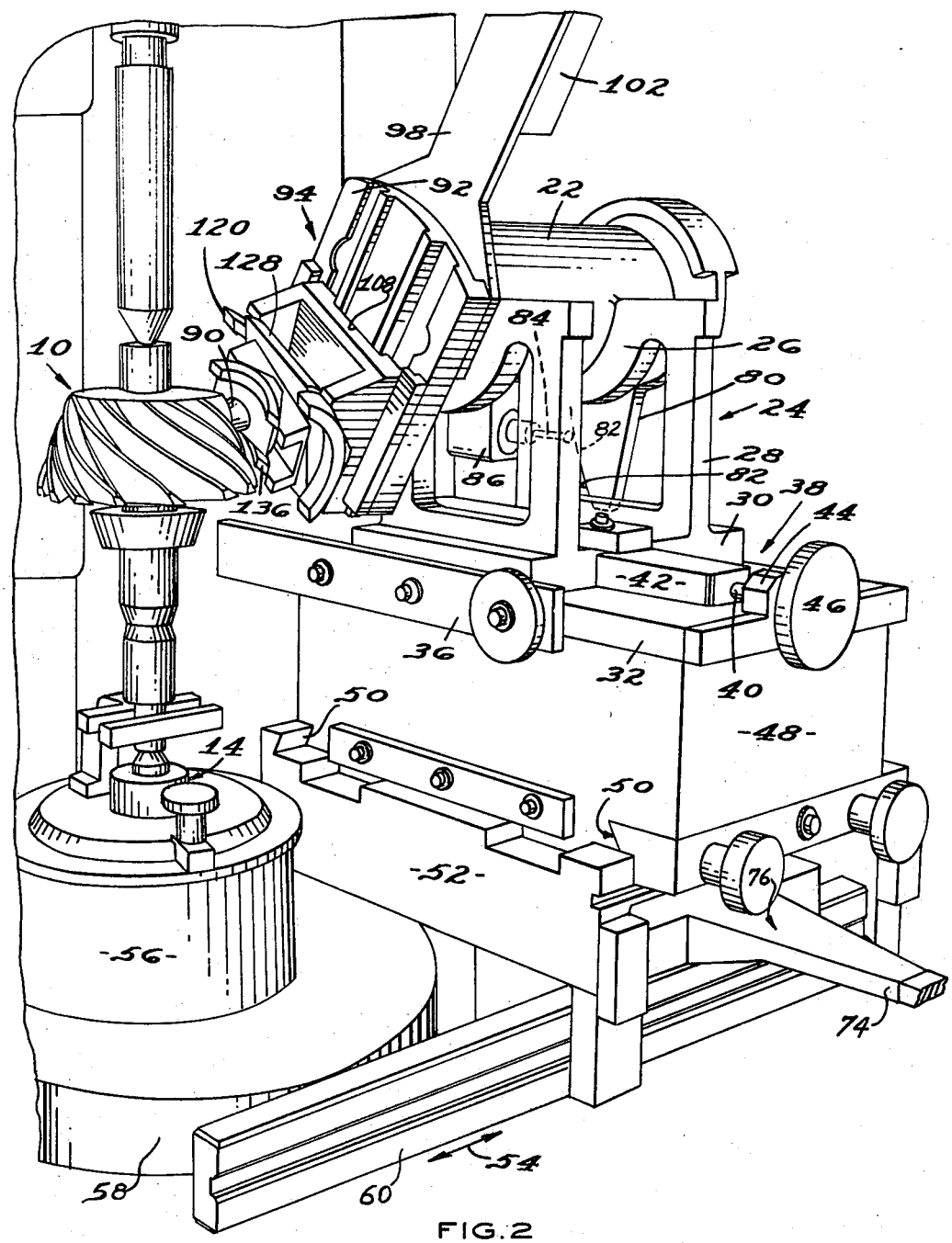
FIGURE 2 shows a view similar to FIGURE 1 with a simulated tooth form stylus substituted for one of the gears of FIGURE 1.

Base 30 may be reciprocated in the direction of arrow 34 by any suitable means, such as, for example, a screw mechanism 38 (FIGURE 2). This latter mechanism includes a threaded bolt 40 rotatably fixed at one end to a block 44 bolted to base 32, its other end threadedly projecting through a block 42 fixed to base 30. A hand knob 46 facilitates movement of base 30 and ring gear 12 (FIGURE 1) to the proper lateral position relative to pinion gear 10.

Platform 32 forms a part of a cross slide table 48. The table has a dovetail type connection 50 with a channel-shaped base member 52 for movement in a horizontal direction (arrow 54) at right angles to the direction of movement of base 30, to thereby position the teeth of ring gear 12 into proper meshing contact with the mating teeth of gear 10. Any suitable means, not shown, may be used to move cross slide table 48, such as a screw mechanism of the kind indicated at 38.

While not shown, it will be clear that other base members could be added to table 48 to permit a sequential tilting of the platform 32 about one or more edges to further control the attitude of platform 32.

In the design of gears of the type shown, that is, an automotive crossed axes hypoid gearset, one of the first things determined is a single point in space where the tooth contact is to take place. Knowing this defines the offset distance that the axis of hypoid pinion gear 10 is displaced from the axis 20 of ring gear 12, and the angle between the gear shafts. As described above, the pinion gear 10 can be vertically adjusted, and ring gear 12 moved in two horizontal planes so to mesh the pinion and ring gear teeth at the chosen contact point at the chosen offset distance. With these adjustments, the gears are in the relative positions shown in FIGURE 1, and are ready to be rolled together to determine if there is any variation from conjugate action.

Figure 4:
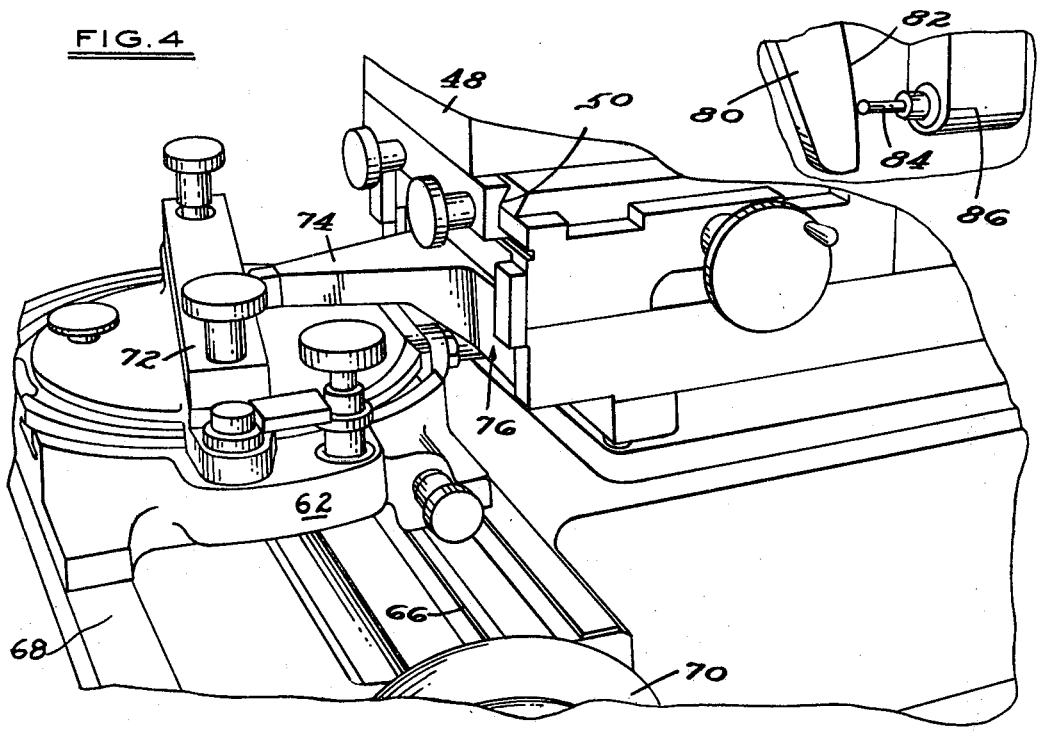
FIGURE 4 illustrates a portion of the details of the driving mechanism of FIGURE 3.
Figure 3:
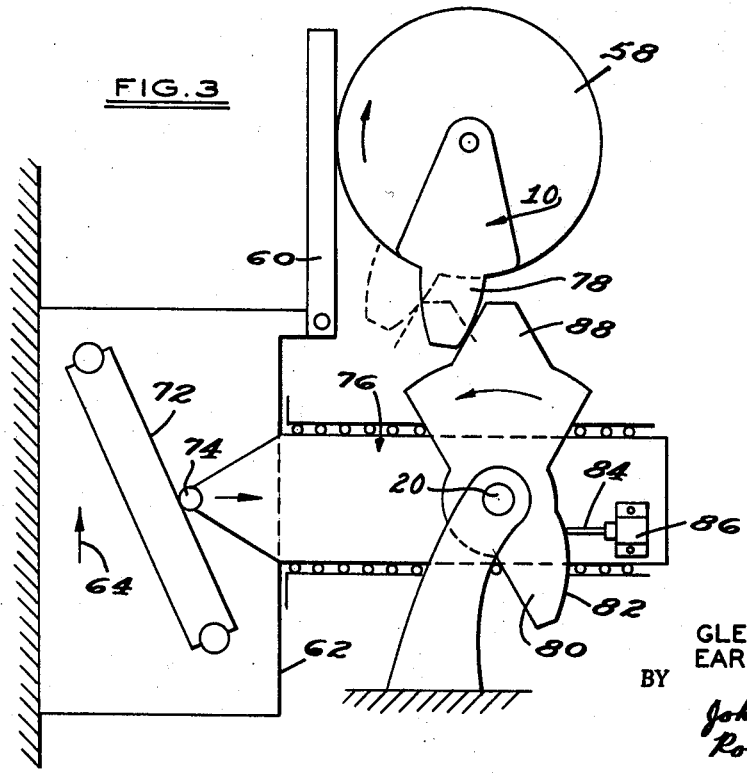
FIGURE 3 illustrates schematically the mechanism for driving the test gear and simulated tooth of FIGURES 1 and 2 at a constant velocity ratio.

The preferred driving arrangement is illustrated schematically in FIGURE 3, and in more detail in FIGURES 2 and 4. It is incorporated within the base structures 56 and 52 of the supports for pinion gear 10 and the ring gear 12. The spindle 14, on which pinion 10 is fixed, has a drive disc 58 that is engaged and rotated by a friction bar 60. Bar 60 is formed as an extension of a cross slide base 62 that is linearly reciprocated in the direction of arrow 64. Base 62 is slidably mounted in tracks 66 on a table 68 (FIGURE 4), and can be moved linearly by any suitable mechanism, such as a known type of screw actuator controlled by a handwheel 70 (FIGURE 4).

Cross slide base 62 has mounted on its an adjustably positionable velocity ratio determining sine bar 72. One face of the sine bar bears against a finger-like extension 74 of a carriage 76, which, as shown in FIGURE 2, is slidable through the channel-shaped opening in base 52. The carriage 76 and extension 74 are biased against the sine bar face by a pendulum suspended weight (not shown) with a force sufficient to maintain engagement between the two at all times, but insufficient to affect the drive.

As thus far described, movement of cross slide base 62, say towards pinion gear 10, will rotate disc 58 and pinion gear 10 (indicated in dotted lines in FIGURE 3 at 78) and simultaneously cause movement of the weight biased extension 74 and carriage 76 at a rate determined by the particular angular setting of sine bar 72.

To determine the conjugate error between the meshing pinion and ring gear tooth surfaces, means are provided to accurately measure the relative angular displacement error of the ring gear tooth surface when the pinion gear tooth surface is used as a reference.

As described previously, ring gear 12 is mounted on one end of spindle 20. The opposite end of the spindle has fixed on it an arm-like member 80 (FIGURES 2 and 5) having a surface 82 in the shape of a perfect involute curve. Surface 82 bears against the movable probe 84 of an electrical sensor or linearly deflectable differential motion detecting apparatus. The housing of the apparatus, shown in FIGURE 2 and indicated schematically in FIGURE 3 at 86, is fixed for movement with carriage 76. The probe 84 would be electrically connected to a suitable pen-type or other known recording mechanism. It would normally be set for a zero reading with linear movement of the probe relative to its housing causing a deviation from the base scale in a known manner.

In FIGURE 3, 88 represents a tooth on ring gear 12. As the tooth is rotated by pinion gear 10, member 80 and the cam surface 82 will rotate and cause the probe 84 to follow the curve of cam surface 82.

In operation, when cross slide 62 and sine bar 72 are moved vertically, as seen in FIGURE 3, friction bar 60 rotates spindle 14 and pinion gear 10 clockwise. Assuming pinion gear 10 and ring gear 12 are properly adjusted so that their teeth are meshed correctly, pinion gear 10 will rotate ring gear 12, spindle 20 and the cam surface 82. Simultaneously carriage 76 is moved laterally to the right by the surface of sine bar 72.

If the meshing tooth surfaces are conjugate, carriage 76 and cam surface 82 and therefore probe 84 will all move to the right as a unit, without movement of probe 84 relative to its housing 86. If there is conjugate error or a deviation from constant angular velocity of the meshing tooth surfaces 78 and 88 relative to each other due to off design characteristics of the teeth, this will appear in the form of an angular displacement error of one tooth surface relative to the other.

This causes a change in the movement of cam surface 82 relative to carriage 76 and, therefore, a linear movement or deflection of the probe 84 relative to its housing 86. The amount of relative motion, of course, is recorded by any suitable recording mechanism, such as the one described previously.

From the above, it will be seen that if the gears are perfectly matched, there will be no deviation from constant angular velocity ratio, and no electrical differential displacement signal would be generated. However, should the tooth surfaces of the gears be of off-design form, a deviation from constant angular rotation would be indicated by movement of the recording probe 84 relative to its initial position.

The above method of analysis provides an indication of whether a particular gearset is a good one; that is, one that has a relatively small deviation from the ratio of constant angular rotation, and therefore, one that has a low noise level.

However, it fails to provide the designer with information as to how far off design the particular test gear teeth are since no indication is given as to which of the gears, or how much of either, varies from design standards insofar as tooth shape is concerned. All that is indicated at this point is the over-all conjugate error between the two. Therefore, the described method furnishes very little information that can be used later to compensate future design of similar gears for this error.

Figure 6:
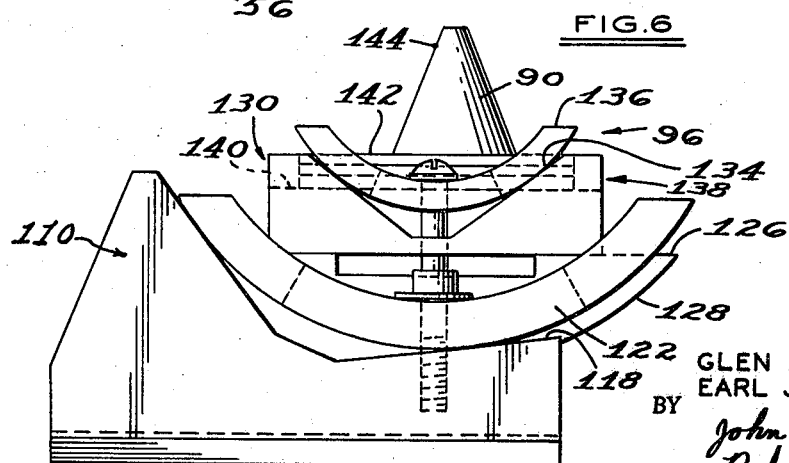
Figure 5:
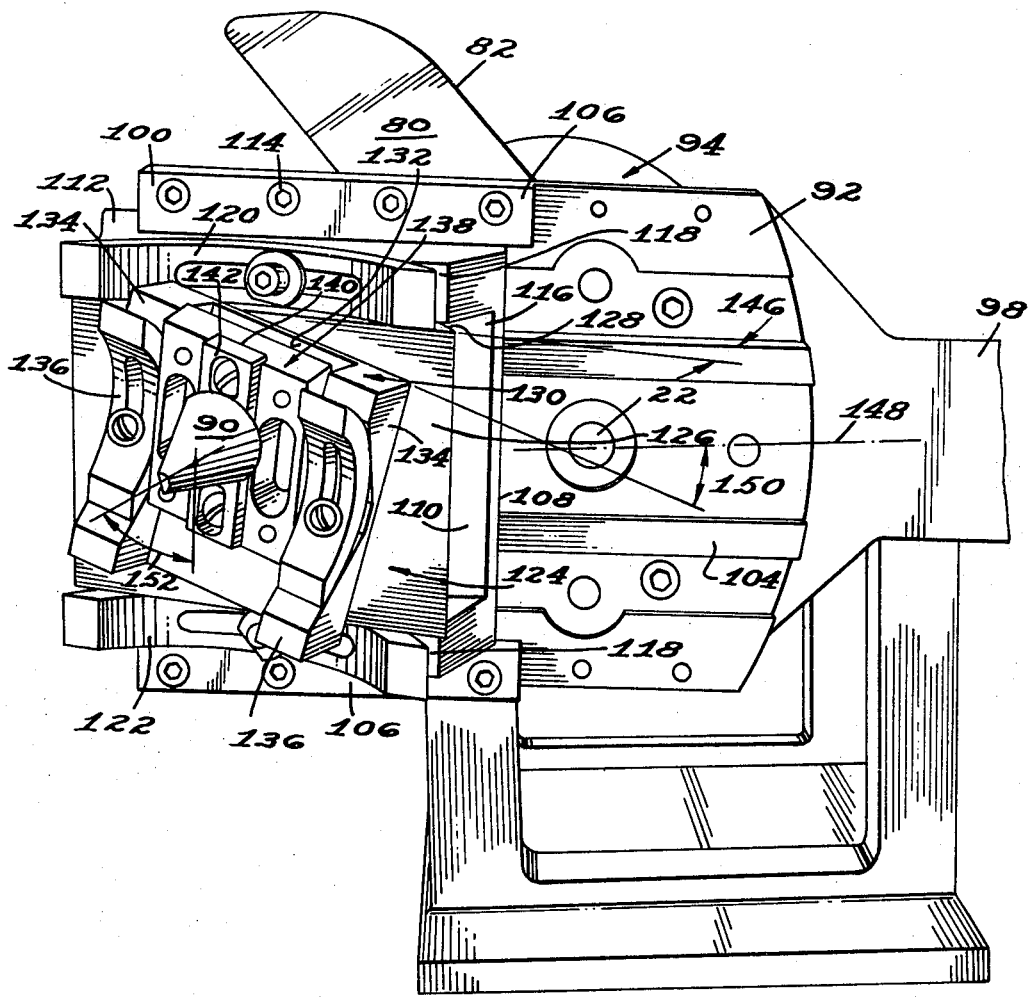
FIGURE 5 is an enlarged elevational view of the stylus support and spindle of FIGURE 2; and, FIGURE 6 is a side-elevational view of the stylus and support of FIGURE 5.

FIGURES 2, 5 and 6 illustrate another portion of the invention to provide this basic off-design information.

As stated previously, when gears of this type are designed, a single point in space is located where, theoretically, the tooth design data is referenced. This then determines the offset distance between the axes of the ring and pinion gears. The gear blanks are then designed so that the gear cutter will pass through this design contact point in a manner to satisfy the kinematic relationship between gear teeth and tooth design.

While gear teeth have many contact points, the design of hypoid gears, for example, has not progressed beyond the point of locating a single mean contact point, and calculating the particular spiral, root, pressure angle unbalance, and cutter angles as related to the offset distance and velocity ratio and other parameters to satisfy the tooth requirements at that point. The rest of the tooth surface is left to be generated by the cutting machine, with the expectation that the shape will fall within design standards to provide conjugate action between ring and pinion gears. This single contact point is calculated to be where the design cones are tangent to each other, and also one through which the tangents to the spiral and pressure angle pass. The designer thus knows what form the tooth should have at this point to satisfy all the parameters. The curvature at the design point can also be calculated.

The offset distance and other assumed parameters determine the particular spiral angle that the cutter must provide at this point to assure proper endwise sliding of the mating gear teeth on each other. The proper tooth pressure angle unbalance must also be chosen to provide symmetrical action on both sides of the tooth. In a complex gear of the type illustrated here, the cutter does not cut a symmetrically formed tooth since the pressure angles are different on opposite sides of the tooth. A particular root angle also must be calculated to determine the depth of the tooth, which tapers along its length.

Once having calculated the particular angles and other dimensions described, the gear cutting machine is set up according to these parameters, and the gear teeth are subsequently cut. At this state (green gear), a theoretically correct gear tooth (insofar as matching the design standards are concerned) should result. Subsequent heat treating, lapping, grinding, and other manufacturing processes, however, cause changes in the gear tooth form. Therefore, the finished tooth surface may not necessarily correspond to design specifications.

The apparatus shown in FIGURES 2, 5 and 6 permits checking kinematically a set of supposedly constant velocity gears for conjugation error, and permits a comparison of the actual gear tooth spiral, pressure and root reference angles to design standards and specifications. In general, the ring gear 12 of FIGURE 1 is replaced by an assembly containing a stylus 90 that is mounted for a universal pivotal movement on a horizontally and rotatably adjustable base 92. This is so it can be positioned in space substantially at any attitude desired with respect to the pinion gear 10. The stylus 90 is carefully machined to simulate a section, be it a profile or lengthwise section, of the actual contact surface of a tooth of ring gear 12, such as tooth 88 of FIGURE 3, for example. Therefore, when the stylus is properly aligned in space and engaged with a mating tooth surface on pinion 10, in a manner to be described, for all intents and purposes, the contact surface between the two is the same as if a tooth of ring gear 12 were actually mated with the pinion gear tooth, as in FIGURE 1.

The simulated tooth can be adjusted so that its contact surface has exactly the same attitude as the corresponding finished surface of the tooth of ring gear 12 that it simulates. Then, when the simulated tooth and pinion gear tooth are rotated by the drive mechanism of FIGURE 3, any conjugate error of the ring gear tooth can be perceived by the differential displacement sensor previously described.

At this point, the angular adjustments of the bases of the stylus to obtain this exact attitude in space can be measured and the values translated into the pitch plane to obtain a measure of the departure from design objectives.

If additional conjugate error information is desired, the stylus 90 can also be re-adjusted so that the spiral, root and cutter unbalance angles of the simulated tooth section correspond exactly to the theoretically correct angles chosen during the design of the ring gear. Then when the simulated tooth and mating pinion gear tooth are rotated together, the differential displacement sensor 84 can detect how much off design the surface is; that is, how much the finishing operation has changed the surface of the tooth.

More specifically, FIGURE 2 shows a setup similar to FIGURE 1, with the exception that ring gear 12 of FIGURE 1 has been removed from spindle shaft 20 and replaced by a rotatable assembly 94 on which is universally mounted the simulated tooth portion stylus 90 described previously. FIGURE 5 shows the assembly 94 rotatably mounted on the support 24. FIGURE 6 is an enlarged view of the subassembly 96 universally mounting the stylus 90.

Assembly 94 has a base member 92 fixed on shaft 20, and having radially extending portions 98 and 100. Portion 98 has a balance weight 102 secured to it to compensate for the weight of the subassembly 96 mounted on opposite radial portion 100. This permits the base 92 to remain in any rotative position attained; that is, it removes the effect of the eccentric mounting of the subassembly on the base so as not to introduce error to the drive when the base 92 is rotated by the pinion gear.

Base portion 92 has two guide tracks 104 and channel-like members 106. The tracks and members cooperate, respectively, with a groove 108 in the bottom of a member 110 and lip flanges 112 on the sides of the member to guide member 110 for a sliding linear movement. Member 110 is normally adjusted to the desired lateral offset position, and then locked in that position by tightening bolts 114.

The upper portion of member 110 has a U-shaped depression 116 defined by a pair of cradles 118. Adjustably mounted on the cradles are a pair of arcuate portions 120 and 122. These latter portions are fixed to the edges of a crescent-shaped secondary base member 124 having a flat upper face 126 and a curved lower face 128. A third base member 130 is adjustably mounted on the upper face of base member 124. It has a flat lower face rotatable on the surface of face 126, and a recessed upper surface 132 defined by two cradle-like upper bosses 134. A pair of arcuate blocks 136 are adjustably mounted on bosses 134 and are secured to a crescent-shaped stylus support member 138. The base 138 has a groove 140 for slidably receiving the support 142 on which the stylus 90 is mounted.

From the above, it will be seen that by individually rocking and rotating the respective base members to various positions, the surface of the stylus 90 can be positioned substantially at any attitude in space desired for proper engagement with the surface of the teeth of pinion gear gear 10.

As stated previously, in the design of gears, a single point in space is chosen about which the teeth are designed. This point has a predetermined offset distance from the axis of rotation of the ring gear, and a predetermined location from the back face of the gear. As best seen in FIGURE 6, the design contact point is indicated at 144 on the conical surface of stylus 90. It is the same distance out axially from the base 92 and at the same lateral offset distance that the contact point on the tooth of ring gear 12 it simulates is. Therefore, it now amounts merely to properly orienting in space the surface containing contact point 144 for a mating engagement of the surface of the tooth 88 with that of the pinion gear tooth surface.

It should be noted that all of the various cradles described above for adjustment of the stylus are mounted so that they pivot around the common design contact point; that is, they all intersect or pass through a common point, this being the contact point 144. This permits adjustment in space of the attitude of tooth section 90 without disturbing the offset distances, etc.

Returning again to FIGURE 5, consider, therefore, the adjustments of the cradles to provide the proper angularity to the simulated tooth section 90. Rocking of base 124 moves the tooth section arcuately to the left or right as seen in FIGURE 5, and positions the tooth surface with a root reference angle indicated at 146. Rotating the base 134 clockwise or counterclockwise with respect to the horizontal axis 148 fixes the stylus surface at a chosen spiral tooth angle; that is, the angle that a tangent to the contact point makes with the horizontal axis 148, as indicated by angle 150. Finally, rocking the base 138 on its cradle tips the stylus 90 out or into the plane of the paper to position the surface at a cutter unbalance angle indicated at 152.

As thus far described, therefore, it will be seen that the stylus can be located in space at specific spiral, cutter unbalance and root angles, such as the design angles, or can be located at an attitude that corresponds exactly to the attitude of the tooth surface it simulates.

Let us now consider a typical gear checking operation. Assume, for example, that we do not know the design spiral, root and cutter unbalance angles for ring gear 12. Then, the first step is to scan the ring gear teeth and trace their exact surface shape. This is accomplished by our gear tooth form scanning device shown and described in our patent U.S. 3,270,425 Gear Tooth Form Checker, and which is incorporated herein by reference. By the procedure and apparatus described in that application, the actual profile and lengthwise curvature of any tooth of ring gear 12 can be accurately simulated. Once the scanner is adjusted to provide a movement corresponding exactly to the shape of a tooth or ring gear 12, then the ring gear in the above application would be removed and replaced by the stylus over-all assembly 94 described in this application, as shown in FIGURE 8 of that application. The various bases and cradles of assembly 94 are then adjusted as described above in connection with FIGURE 5, until a point is reached where the scanner of U.S. 3,270,425 can be moved over the surface of the conical stylus 90 without causing any deviation or deflection of the scanner pickup. Once this is attained, the conical stylus 90 will then have been oriented in space so that its contact surface attitude simulates exactly the attitude of the finished surface section of the tooth of ring gear 12 it represents.

The next step is to then mount the adjusted stylus assembly 94 on housing 24 in the manner shown here in FIGURE 2, the simulated tooth section being in mesh with the mating pinion gear tooth or teeth. At this time, the contact surface of stylus 90 has an attitude in space that is identical to the attitude of the finished tooth surface of ring gear 12 that it represents.

If the pinion gear 10 now is rotated by the drive mechanism shown in FIGURE 3, that is, by rotating hand wheel 70, then if the mating teeth surfaces are conjugate, a zero reading will be recorded by the differential displacement apparatus. If there is conjugate error due to a misshape of the ring gear tooth, this will show up as a linear displacement of the probe 84 relative to the carriage 76; that is, the carriage 76 will move faster or slower to the left or right in FIGURE 3, as the case may be, than the probe 84 is being moved by the involute cam surface 82 rotatable with spindle shaft 22.

Thus, the amount of conjugate error of the ring gear tooth relative to the mating pinion gear tooth can be accurately measured. This informs the designer how much conjugate error there is in the gearset, and, therefore, whether it will be a noisy or quiet gearset.

Now, assume the designer wants additionally to know how the finished shape of the ring gear tooth varies from the design parameters originally chosen. The angles of stylus bases 124, 134 and 138 are then measured and the values translated into the pitch plane. The difference between these stylus base angles so translated and the design angles thus provides a measure of the departure from design objectives. Such information can be used to control high volume production so that all ring gears are cut to the same standard.

It should be noted that the stylus 90 represents the profile surface of a tooth at only one particular point along the conical lengthwise surface of the tooth, and that other carefully ground interchangeable simulated tooth sections representing other specific points along the profile or lengthwise curvature of the tooth would be substituted for stylus 90, and the operation repeated to obtain a complete check of the tooth shape. FIGURE 9, of our patent referred to previously, shows, for example, a second stylus 181 representing a section of the lengthwise curvature of a tooth contact surface.

From the foregoing, therefore, it will be seen that the invention can be used to check the variation in angular displacement from a constant velocity ratio of the meshing tooth surfaces of any matched set of constant velocity type gearing; and that the tooth surface attitude of a specific gear can be checked against design standards. The invention has been illustrated specifically for use in checking the large automotive hypoid pinion, constant velocity, crossed axes type matched gearsets. However, it will be clear to those skilled in the arts to which the invention pertains that it would be equally applicable to check straight bevel gears, spiral formate and spiral generated gears, and hypoid generated bevel gears, for example, without departing from the scope of the invention.

We claim:

1. An apparatus for checking kinematically the conjugate action of a matched set of constant velocity ratio, offset axes type gears, including, a first test gear mounting member for mounting a first gear of said matched set having an axis of rotation extending in one direction, a second test gear mounting member for mounting a simulated tooth portion of the other gear of said matched set for rotation about an axis offset from and non-parallel to the axis of rotation of the first test gear adapted to rollably engage the face of a tooth of said first gear, said tooth portion having a rolling contact surface simulating a section along the contact surface of a tooth of the other gear, a plurality of adjustable interdigited relatively movable means mounting said simulated tooth portion mounting member for an adjustment in space selectively to an attitude of said tooth portion corresponding to the desired design or actual attitude attained by the tooth portion surface it represents, said relatively movable means including first cradle means secured to said tooth portion, second means mounting said cradle means for an angular pivotal movement about the theoretical design contact point on said tooth portion, further means mounting said second means for a rotational adjustment about the said contact point, second cradle means mounting said first cradle means and said further means for an angular movement about said contact point, and additional means mounting said second cradle means both for a rotational adjustment about the axis of said second test gear mounting member and a slidable adjustment laterally of the said latter axis, means for rolling each of said gear teeth at a constant velocity ratio relative to the other, said latter means drivingly rolling said first gear against said simulated mating gear tooth portion, and constant velocity ratio deviation means operably connected to said first gear and tooth portion movable in response to variations from conjugate action of said teeth during the rolling thereof for recording said variations.

2. An apparatus as in claim 1, said tooth portion contact surface constituting a facsimile of a profile section of a tooth of the other gear.

3. An apparatus as in claim 1, said tooth portion contact surface constituting a facsimile of a section of the lengthwise curvature of a tooth of the other gear.

References Cited

UNITED STATES PATENTS

| | | | |
|---|---|---|---|
| 2,956,345 | 10/1960 | Dinger | 33—179.52 |
| 2,108,414 | 2/1938 | Schurr | 33—179.5 |
| 1,886,543 | 11/1932 | Hansen | 33—179.5 |
| 2,602,236 | 7/1952 | Muller | 33—179.53 |

LEONARD FORMAN, Primary Examiner

R. A. FIELDS, Assistant Examiner